US008094687B2

(12) United States Patent
Cheng et al.

(10) Patent No.: US 8,094,687 B2
(45) Date of Patent: Jan. 10, 2012

(54) METHOD AND APPARATUS OF CLOCK TRANSMISSION BETWEEN NETWORKS

(75) Inventors: Yong Cheng, Shenzhen (CN); Xiaodong Bao, Shenzhen (CN); Zhan Zhang, Shenzhen (CN); Yinghai He, Shenzhen (CN); Ning Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 12/433,285

(22) Filed: Apr. 30, 2009

(65) Prior Publication Data

US 2009/0207863 A1 Aug. 20, 2009

Related U.S. Application Data

(63) Continuation of application No. PCT/CN2008/000820, filed on Apr. 21, 2008.

(30) Foreign Application Priority Data

Apr. 30, 2007 (CN) .......................... 2007 1 0102025

(51) Int. Cl.
*H04J 3/06* (2006.01)

(52) U.S. Cl. ........................................................ 370/503

(58) Field of Classification Search .................. 370/350, 370/395.62, 503, 352, 357, 395.5
See application file for complete search history.

(56) References Cited

U.S. PATENT DOCUMENTS

| | | | |
|---|---|---|---|
| 6,173,023 | B1 | 1/2001 | Tanonaka et al. |
| 6,966,009 | B1 | 11/2005 | Boduch |
| 2008/0117938 | A1 | 5/2008 | Erich et al. |

FOREIGN PATENT DOCUMENTS

| | | | |
|---|---|---|---|
| CN | 1352500 | A | 6/2002 |
| CN | 1870490 | A | 11/2006 |
| CN | 101043316 | A | 9/2007 |
| DE | 19927303 | A1 | 1/2001 |
| EP | 2131530 | A1 | 3/2007 |
| WO | WO 2006/063922 | A1 | 6/2006 |
| WO | WO 2008/120382 | A1 | 10/2008 |

OTHER PUBLICATIONS

Extended European Search Report in corresponding European Application No. 08734011.3 (Feb. 25, 2011).

Written Opinion of the International Searching Authority in corresponding PCT Application No. PCT/CN2008/000820 (Aug. 14, 2008).

(Continued)

*Primary Examiner* — Ayaz Sheikh
*Assistant Examiner* — Blanche Wong
(74) *Attorney, Agent, or Firm* — Leydig, Voit & Mayer, Ltd.

(57) ABSTRACT

A method of clock transmission between networks and an apparatus of clock transmission are disclosed, in which a second group of information corresponding to a clock transferred by a first network equipment based on a first protocol, and the second group of information corresponding to a clock transferred by a second network equipment based on a second protocol are acquired, and a source selection is performed in a united way by adopting a source selection manner based on the second protocol according to the second group of information. Therefore, the equipment in different types of networks can conveniently select a clock with a higher class from clocks transferred based on different protocols, so as to realize a normalization management on the clocks transferred based on different protocols.

7 Claims, 8 Drawing Sheets

OTHER PUBLICATIONS

"G.8261/Y.1361—Timing and synchronization aspects in Packet Networks," Series G: Transmission Systems and Media, Digital Systems and Networks—Ethernet over Transport aspects—Quality and availability targets, Series Y: Global Information Infrastructure, Internet Protocol Aspects and Next-Generation Networks—Internet Protocol aspects—Transport, May 2006, International Telecommunication Union, Geneva, Switzerland.

"TD478R1—Draft ITU-T Rec. G.8261 (for consent)," Study Group 15, Feb. 11-22, 2008, International Telecommunication Union, Geneva, Switzerland.

"IEEE P1588™ D2.2—Draft Standard for a Precision Clock Synchronization Protocol for Networked Measurement and Control Systems," Precise Networked Clock Synchronization Working Group of the IM/ST Committee, 2007, Institute of Electrical and Electronic Engineers, New York, New York.

Mayer, "Functional Modeling for Synchronization Networks," 2006, Nortel, Prague, Czech Republic.

METHOD AND APPARATUS OF CLOCK TRANSMISSION BETWEEN NETWORKS

CROSS-REFERENCE TO RELATED APPLICATIONS

This application is a continuation of International Patent Application No. PCT/CN2008/000820, filed Apr. 21, 2008, which claims priority to Chinese Patent Application No. 200710102025.2, filed Apr. 30, 2007, both of which are hereby incorporated by reference in their entirety.

FIELD OF THE TECHNOLOGY

The present invention relates to a communication field, in particular, to a technique of clock transmission between networks.

BACKGROUND

The telecommunication transport network has been evolved from a time division multiplexing (TDM) transport network, for example, synchronous digital hierarchy (SDH)/synchronous optical network (SONET) to a packet switching (PS) transport network. In order to ensure the network stability and service continuity, a progressive evolution manner is usually adopted, so that the two transport networks coexist and are converged for quite a long time.

The two transport networks have their respective clock transmission manners. The clock transmission of the TDM transport network is based on the SDH protocol. Referring to FIG. 1, the clock transmission manner for the SDH network is shown. It may be known that the equipment in the SDH network acquires a clock from a primary reference clock (PRC), then transfers the clock in a physical layer, and transfers a synchronization status message (SSM) representing a clock quality class through a multiplex section overhead of a multiplex section based on the SDH protocol. The SSM is defined as follows.

TABLE 1

| Quality Class | Value (hex) | Please Add | Clock |
|---|---|---|---|
| QL-PRC | 0X10 | $<1*10^{-11}$ | Class-1 Clock |
| QL-SSU-A | 0X100 | $1.6*10^{-8}$ | Rubidium Clock Class-2 Clock |
| QL-SSU-B | 1000 | 4.6 ppm | Local Clock Class-2 Clock |
| QL-SEC | 1011 | <4.6 ppm | Local Clock |
| QL-DNU | 1111 | | |

The PS transport network has two clock transmission manners.

The first one is a synchronous Ethernet clock transmission.

The synchronous Ethernet clock transmission is also based on the SDH protocol. Referring to FIG. 2, the equipment in the synchronous Ethernet acquires a clock from the PRC, then transfers the clock in the physical layer, and transfers the SSM representing the clock quality class through an Operation, Administration, and Maintenance (OAM) packet based on the SDH protocol.

The second one is an IEEE 1588 PTP clock transmission.

The IEEE 1588 PTP clock transmission is based on a precision time protocol (PTP). Referring to FIG. 3, the time and the time quality class are transferred through an IEEE 1588 PTP packet based on the PTP. For example, the timeSource information representing an initiation point of a reference time and the information of the PTP Clock Class information representing the time quality class are transmitted through an announce packet, and a precise clock is transmitted through an Sync (synchronous) packet. The time difference information is transmitted through delay-req (delay request) and delay-resp (delay response) packets. The head formats of the above packets are the same. According to the timeSource, the types of the clocks may be identified. According to the information of the PTP Clock Class, the clock frequency information may be computed. According to the time difference information, the current system time may be adjusted.

As seen from the above three clock transmission manners of the two transport networks, the following conclusion is reached.

As for the clock transmission manners of both the SDH network and the synchronous Ethernet, the clock is transferred via the physical layer, and the SSM representing the clock quality class is transferred based on the SDH protocol. Thus, when the SDH network and the synchronous Ethernet are converged, the clock transmission can also be well united. As for the IEEE 1588 PTP network, the time precision class is determined according to the timeSource information and the information of the PTP Clock Class transmitted based on the PTP, and the information has nothing to do with the clock, which is significantly different from the SDH network in which the clock quality class is determined according to the SSM transmitted based on the SDH protocol. Therefore, the equipment that supports merely one of the protocols cannot compare the qualities of the clocks transferred based on different protocols, so that the clock with the higher class cannot be selected. For example, referring to FIG. 4, an upper layer network is the IEEE 1588 PTP network, and the TDM network is connected subsequently. The IEEE 1588 PTP network can provide a recovered class-1 clock to the TDM network. After receiving the clock provided by the IEEE 1588 PTP network, the equipment in the TDM network fails to determine whether the quality class of the clock provided by the IEEE 1588 PTP network is higher than that of the class-2 clock provided by a building integrated timing supply system (BITS), since no SSM representing the clock quality class is carried. Therefore, the equipment only selects the class-2 clock provided by the BITS, instead of the class-1 clock provided by the IEEE 1588 PTP network, that is to say, the equipment in the TDM network selects the clock with a lower class instead of the one with a higher class as a clock source.

SUMMARY

Embodiments of the present invention provide a method and an apparatus of clock transmission between networks, in which network equipment can conveniently select a clock with a higher class from clocks transferred based on different protocols.

The embodiments of the present invention are realized through the following technical solution.

The embodiments of the present invention provide a method of clock transmission between networks, which includes the following steps.

A second group of information corresponding to a clock transferred by a first network equipment based on a first protocol, and the second group of information corresponding to a clock transferred by a second network equipment based on a second protocol are acquired.

A source selection is performed in a united way on the clock transferred by the first network equipment based on the first protocol and the clock transferred by the second network equipment based on the second protocol by adopting a source selection manner based on the second protocol according to the obtained second group of information.

The second group of information corresponding to a selected clock source is transmitted based on the second protocol according to the clock of the selected clock source.

The embodiments of the present invention further provide a method for transmitting clock quality class information, which includes the following steps.

A synchronous status message (SSM) representing a clock quality class is carried in a packet based on a precision time protocol (PTP).

The packet based on the PTP is transmitted.

The embodiments of present invention further provide an apparatus for clock transmission, including a second protocol source selection unit and a second protocol transmission unit.

The second protocol source selection unit is adapted to acquire a second group of information corresponding to a clock transferred by a first network equipment based on a first protocol, and the second group of information corresponding to a clock transferred by a second network equipment based on a second protocol, and perform a source selection in a united way on the clock transferred by the first network equipment based on the first protocol and the clock transferred by the second network equipment based on the second protocol by adopting a source selection manner based on the second protocol according to the obtained second group of information.

The second protocol transmission unit is adapted to transmit a second group of information corresponding to a selected clock source based on the second protocol according to the clock of the selected clock source.

The embodiments of the present invention further provide an apparatus for transmitting clock quality class information which includes a construction unit and a transmission unit.

The construction unit is adapted to carry an SSM representing a clock quality class in a packet based on the PTP.

The transmission unit is adapted to transmit the packet based on the PTP.

As seen from the detailed implementation solution of the embodiments of the present invention, the second group of information corresponding to the clock transferred by the first network equipment based on the first protocol, and the second group of information corresponding to the clock source transferred by the second network equipment based on the second protocol are acquired, and then the source selection is performed in a united way by adopting the source selection manner based on the second protocol according to the obtained second group of information. Therefore, the equipment in different types of networks can conveniently select a clock with a higher class from clocks transferred based on different protocols.

DETAILED DESCRIPTION

In an embodiment of the present invention, considering a format of the current PTP Clock Class as shown in Table 2, a corresponding relation between the PTP Clock Class and an SSM as shown in Table 3 is established.

TABLE 2

| Value (hex) | PTP Clock Class |
|---|---|
| 0 | Highest class |
| 1-5 | Reserved |
| 6 | PRC, source with higher tacking precision |
| 7 | An initial stage for maintaining 6 is 7 and cannot serve as a slave one |
| 8-12 | Reserved |
| 13 | Source with common tracking precision, for example, PTP |
| 14 | An initial stage for maintaining 13 is 14 and cannot serve as a slave one |
| 15-51 | Reserved |
| 52 | Degradation A for maintaining 6 |
| 53-57 | Reserved |
| 58 | Degradation A for maintaining 13 |
| 59-67 | Reserved |
| 68-122 | For transferring frequency information |
| 123-132 | Reserved |
| 133-170 | For transferring frequency information |
| 171-186 | Reserved |
| 187 | Degradation B for maintaining 6 |
| 188-192 | Reserved |
| 193 | Degradation B for maintaining 13 |
| 194-215 | Reserved |
| 216-232 | For use by alternate PTP profiles |
| 233-253 | Reserved |
| 254 | Default value, when the class is not set |

TABLE 3

| PTP Clock Class Value | SSM Value |
|---|---|
| 0, 6, 7, 13, 14 | QL-PRC |
| 52, 58 | QL-SSU-A |
| 187, 189 | QL-SEC |
| Others | Unknown |

When a network transferring the information of the PTP Clock Class based on a PTP and a network transferring the SSM based on an SDH protocol or a SONET protocol are converged, based on the corresponding relation between the PTP Clock Class and the SSM as shown in Table 3, the clock transmission of a converged heterogeneous network may be conveniently realized.

Figure 1:
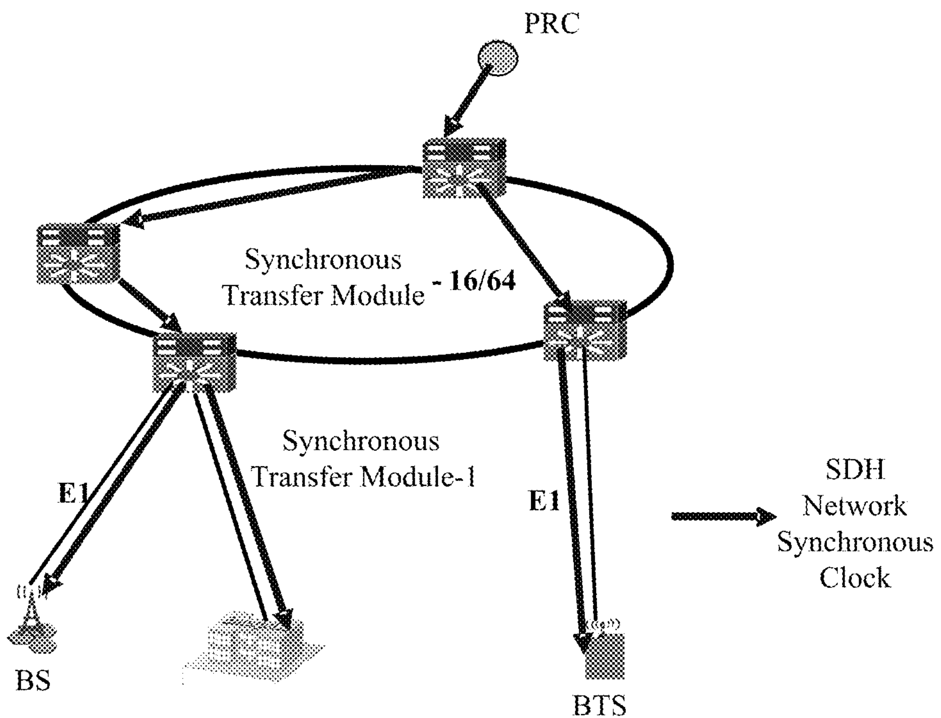
FIG. 1 is a schematic view of clock transmission of an SDH network.
Figure 2:
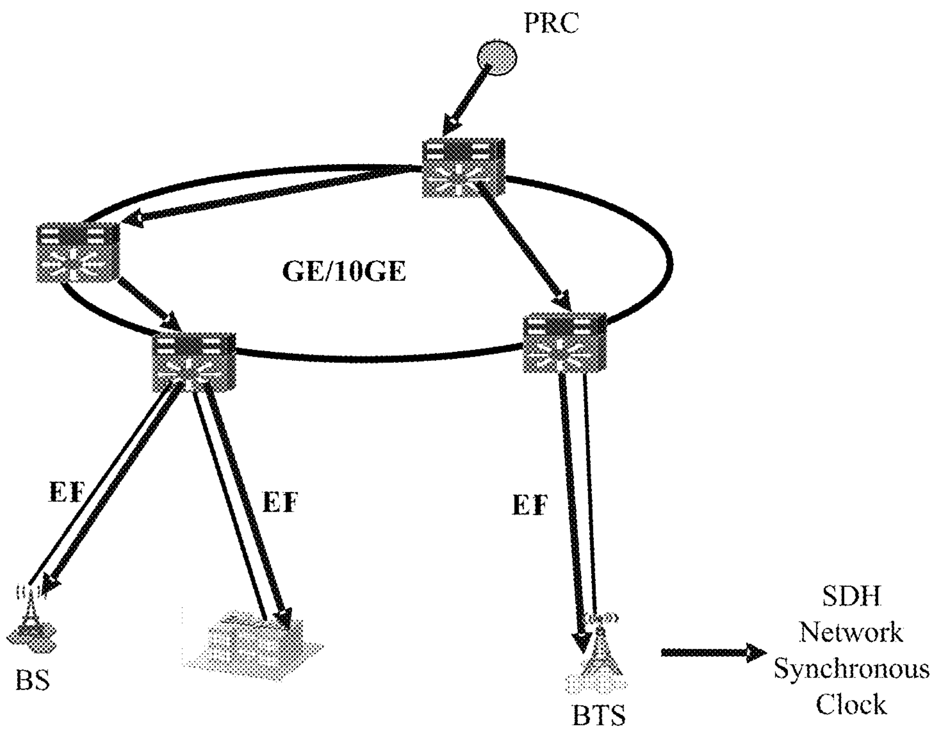
FIG. 2 is a schematic view of clock transmission of a synchronous Ethernet.
Figure 3:
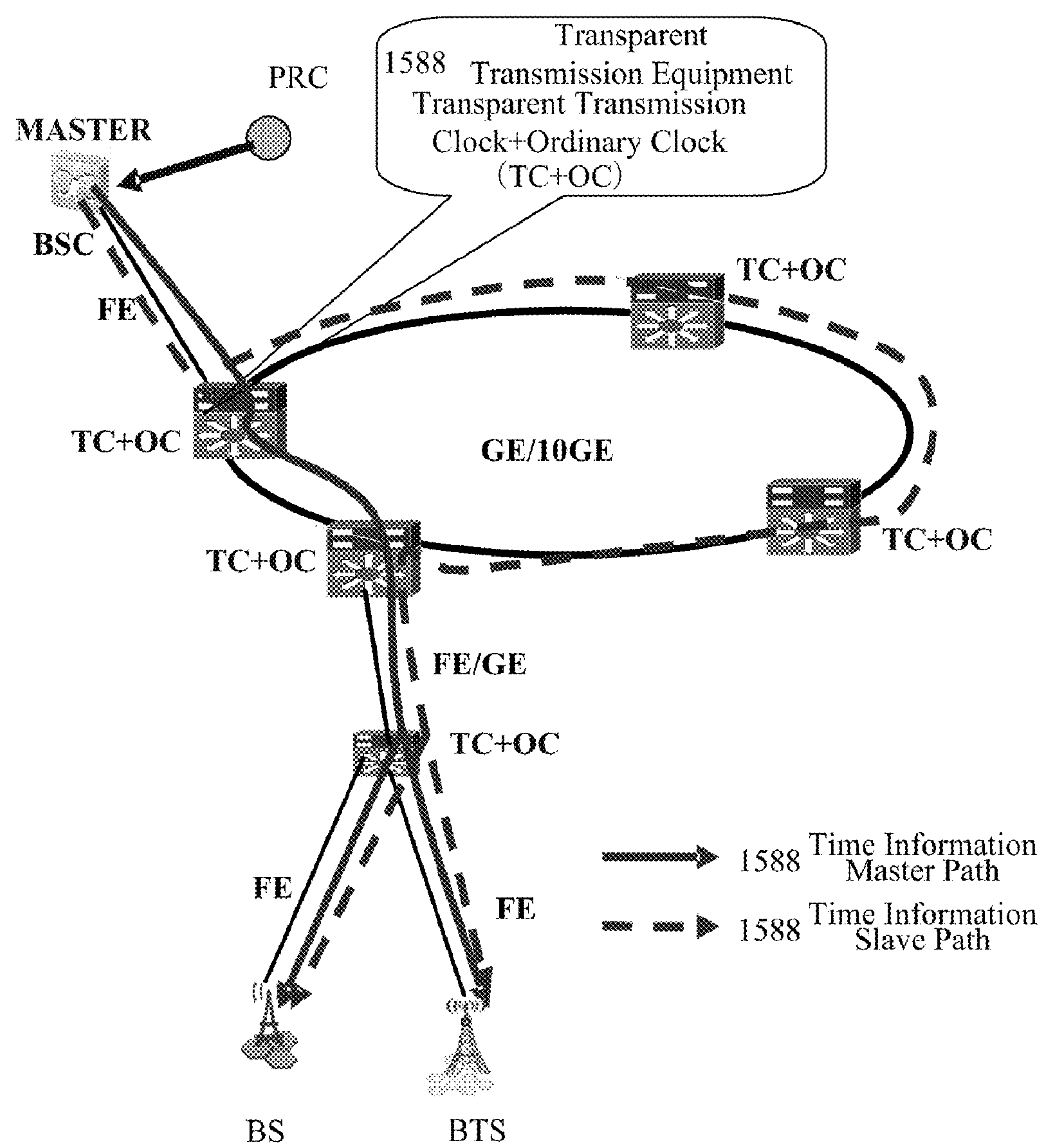
FIG. 3 is a schematic view of clock transmission of an IEEE 1588 PTP network.
Figure 4:
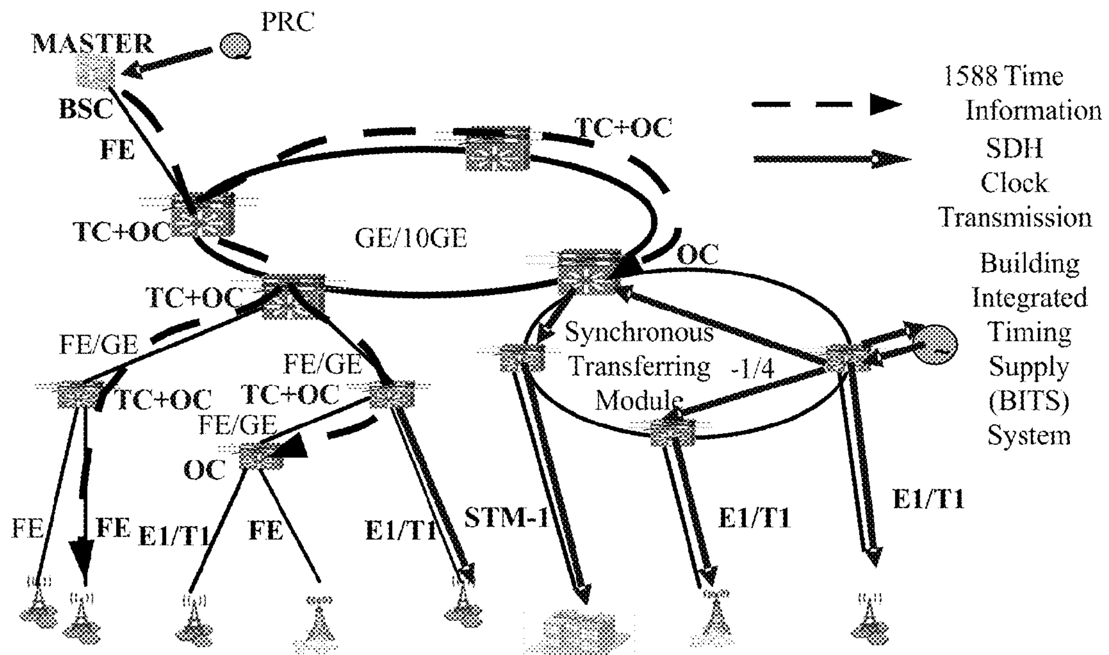
FIG. 4 is a schematic view of clock transmission after the IEEE 1588 PTP network and the SDH network are converged.
Figure 5:
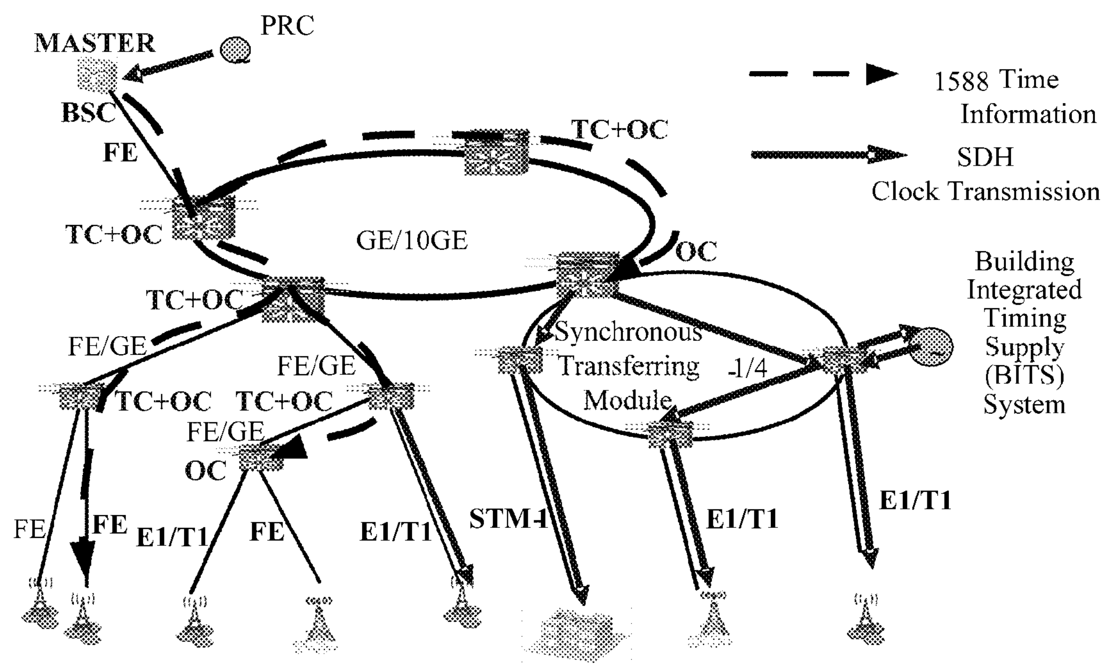
FIG. 5 is a schematic view of a situation after the SDH network and the IEEE 1588 PTP network are converged according to a first embodiment of the present invention.
Figure 6:
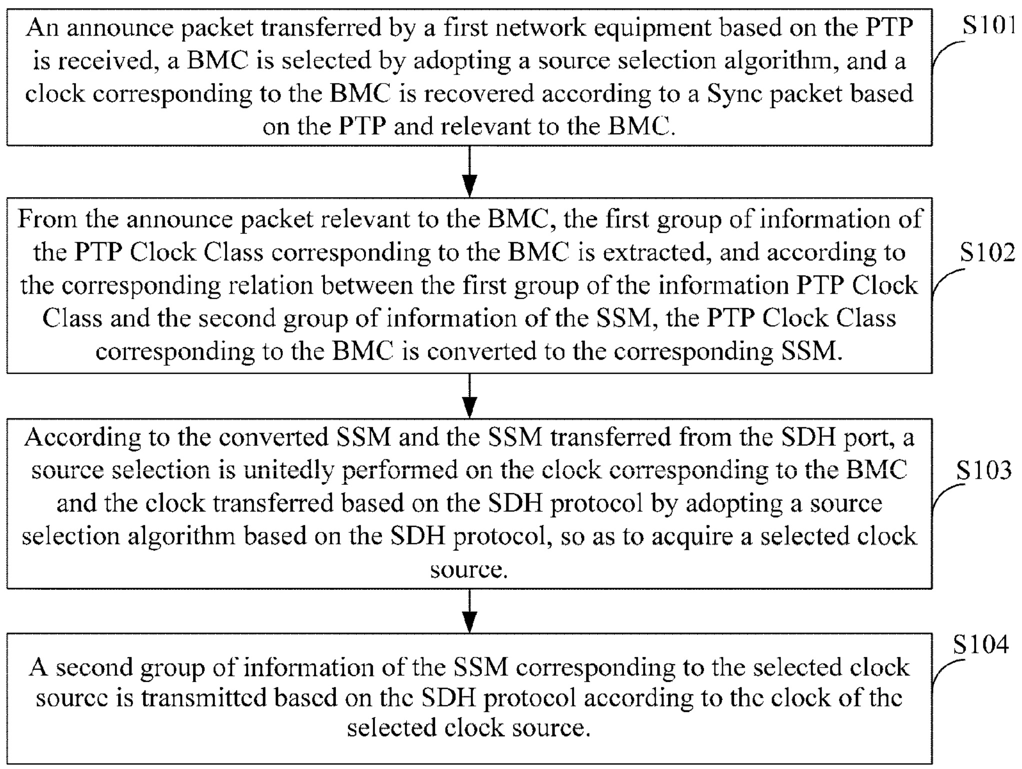
FIG. 6 is a flow chart of the first embodiment of the present invention.

In a first embodiment of the present invention, a method of clock transmission between networks is provided. Under a situation shown in FIG. 5 that the SDH network and the IEEE 1588 PTP network are converged, the detailed implementing process that the SDH network based on the SDH protocol uses a clock transferred by the IEEE 1588 PTP network based on the PTP is described below. Here, the IEEE 1588 PTP network serves as a first network based on the PTP, and the SDH network serves as a second network based on the SDH protocol. The flow is shown in FIG. 6 and includes the following steps.

In Step S101, an announce packet transferred by a first network equipment based on the PTP is received, a BMC is selected by adopting a source selection algorithm based on the PTP, and a clock corresponding to the BMC is recovered according to a Sync packet based on the PTP and relevant to the BMC.

Furthermore, time different information corresponding to the BMC may be recovered according to delay-req and delay-resp packets based on the PTP and relevant to the BMC. The system time is adjusted according to the recovered time difference information.

The source selection algorithm based on the PTP may be a best master clock (BMC) source selection algorithm, and may also be other source selection algorithms. The BMC source selection algorithm is described as follows.

(1) An announce packet sent from each port supporting the PTP is received, the BMC is selected according to clock source information carried by the announce packet, in which the clock source information includes a clock source quality class, a clock source number, a TOP structure for network transmission, etc.

(2) According to the allocation and a port number of the selected BMC, it is determined each port is a slave port (clock source port), a master port (a port for distributing the clock), or a passive port (a port that does not distribute or track).

(3) At the slave port (clock source port), the Sync packet and delay-resp packet based on the PTP are periodically received, and the delay-req packet based on the PTP is transmitted.

(4) At the master port (the port for distributing the clock), the Sync packet and the delay-resp packet based on the PTP are periodically transmitted, and the delay-req packet is received.

(5) According to the received Sync packet, a precise clock is recovered. According to the received delay-req packet and delay-resp packet, the time difference information is recovered.

In Step S102, from the announce packet relevant to the BMC, the first group of information PTP Clock Class corresponding to the BMC is extracted, and according to the corresponding relation (as shown in Table 3) between the first group of information PTP Clock Class and the second group of information SSM, the PTP Clock Class corresponding to the BMC is converted to the corresponding SSM.

Through the converting process in Step S102, the second group of information SSM corresponding to the clock transferred by the first network equipment is indirectly acquired, and then the following steps are executed.

In Step S103, according to the converted SSM and the SSM transferred from the SDH port, a source selection is performed in a united way on the clock corresponding to the BMC and the clock transferred based on the SDH protocol by adopting a source selection algorithm based on the SDH protocol, so as to acquire a selected clock source.

The source selection algorithm based on the SDH protocol may be a G.781 source selection algorithm, and may also be other source selection algorithms based on the SDH protocol. The source selection performed in a united way by adopting the G.781 source selection algorithm is set as an example for illustrating the source selecting process. Firstly, it is determined whether a clock source forcedly switched manually exists or not. If yes, the clock source forcedly switched manually must be selected. Otherwise, a clock source with the highest quality class is selected according to the corresponding relation between the quality class represented by the SSM and the clock source as shown in Table 1. If the quality classes represented by the SSM are the same, a clock source with the highest priority is selected according to the manually set priorities.

In Step S104, a second group of information SSM corresponding to the selected clock source is transmitted based on the SDH protocol according to the clock of the selected clock source.

If a clock source corresponding to the SSM converted from the PTP Clock Class information in the packet transferred by the IEEE 1588 PTP port is selected, the current system time is adjusted according to the recovered time difference information. When each port based on the SDH protocol outputs services, the SSM acquired by conversion is encapsulated in a section overhead of a multiplex section and is transmitted according to the clock of the selected clock source.

An equipment of the next level that receives the second group of information SSM performs a source selection in a united way on clocks recovered by each port according to the second group of information SSM corresponding to the selected clock source and the SSM transferred from other ports of the equipment based on the SDH protocol by adopting a source selection manner based on the SDH protocol, and transmits an SSM corresponding to a selected clock source to an equipment of a further next level according to the clock of the selected clock source, and so forth. This above process continues until the equipment of the last level has performed the source selection. In the embodiment, the equipment in different types of networks is enabled to select a clock with a higher class from the clocks transferred based on different protocols.

Figure 7:
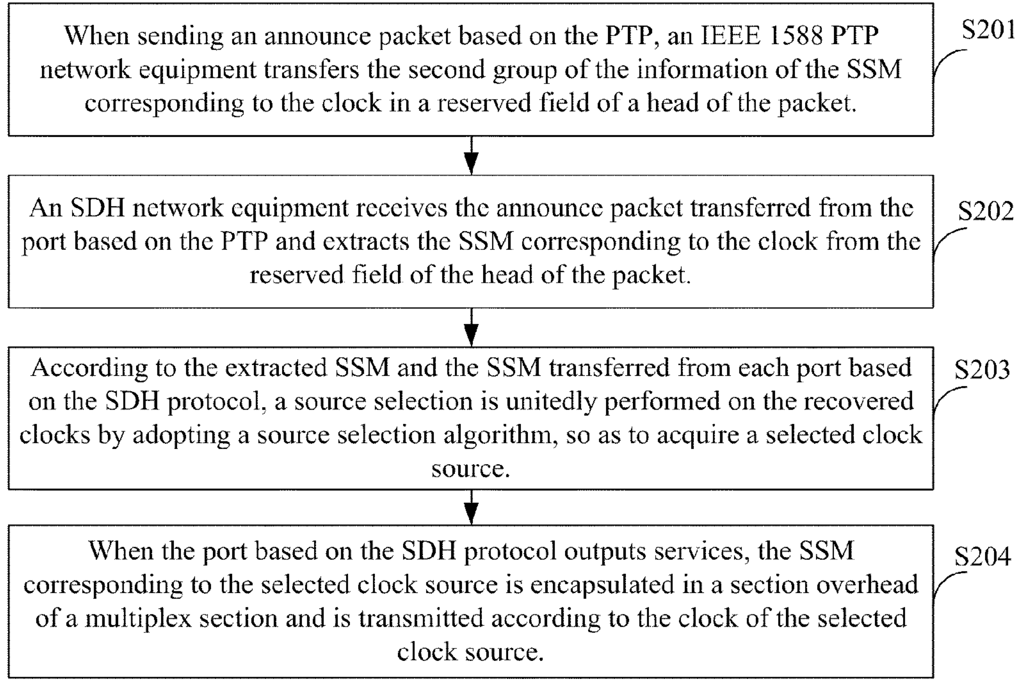
FIG. 7 is a flow chart of a second embodiment of the present invention.

In a second embodiment of the present invention, a second method of clock transmission between networks is provided. Similarly, under the situation shown in FIG. 5 that the SDH network and the IEEE 1588 PTP network are converged, a detailed implementing process that the SDH network uses the clock transferred by the IEEE 1588 PTP network is described. Here, the IEEE 1588 PTP network serves as a first network based on a first protocol (PTP), and the SDH network serves as a second network based on a second protocol (SDH protocol). The flow is shown in FIG. 7, and includes the following steps.

In Step S201, when sending an announce packet based on the PTP, an IEEE 1588 PTP network equipment transfers the second group of information, i.e., SSM, corresponding to the clock in a reserved field of a head of the packet.

Considering that some reserved fields are still preserved in the defined format of the head of the PTP packet as shown in Table 4, the second group of information SSM corresponding to the clock may be transmitted in the reserved field, for example, the reserved field of the 16th byte in Table 4, but it is not limited thereto.

TABLE 4

| Bits | | | | | | | | | |
|---|---|---|---|---|---|---|---|---|---|
| 7 | 6 | 5 | 4 | 3 | 2 | 1 | 0 | Octets | Offset |
| transportSpecific | | | | messageType | | | | 1 | 0 |
| reserved | | | | versionPTP | | | | 1 | 1 |

TABLE 4-continued

| Bits | | | | | | | | | |
|---|---|---|---|---|---|---|---|---|---|
| 7 | 6 | 5 | 4 | 3 | 2 | 1 | 0 | Octets | Offset |
| messageLength | | | | | | | | 2 | 2 |
| domainNumber | | | | | | | | 1 | 4 |
| reserved | | | | | | | | 1 | 5 |
| flags | | | | | | | | 2 | 6 |
| correctionField | | | | | | | | 8 | 8 |
| Reserved | | | | | | | | 4 | 16 |
| sourcePortIdentity | | | | | | | | 10 | 20 |
| sequenceId | | | | | | | | 2 | 30 |
| control | | | | | | | | 1 | 32 |
| logMeanMessageInterval | | | | | | | | 1 | 33 |

In Step S202, an SDH network equipment receives the announce packet transferred from the port based on the PTP, parses the information carried in the packet, and extracts the SSM corresponding to the clock from the reserved field of the head of the packet.

Through the above step, the second group of information corresponding to the clock transferred by the first network equipment is directly acquired from the packet.

In Step S203, according to the extracted SSM and the SSM transferred from each port based on the SDH protocol, a source selection is performed in a united way on the recovered clocks by adopting a source selection algorithm based on the SDH protocol, so as to acquire a selected clock source.

The source selection algorithm based on the SDH protocol may be a G.781 source selection algorithm, and may also be other source selection algorithms based on the SDH protocol.

In Step S204, when the port based on the SDH protocol outputs services, the SSM corresponding to the selected clock source is encapsulated in a section overhead of a multiplex section and is transmitted according to the clock of the selected clock source.

Similar to the above embodiment, an equipment of the next level that receives the second group of information SSM performs a source selection in a united way on clocks recovered by each port according to the second group of information SSM corresponding to the selected clock source and the SSM transferred from other ports of the equipment based on the SDH protocol by adopting a source selection manner based on the SDH protocol, and transmits an SSM corresponding to a selected clock source to equipment of a further next level according to the clock of the selected clock source, and the like. The above process continuous until the equipment of the last level performs the source selection. In the embodiment, the equipment in the different types of networks is enabled to select a clock with a higher class from the clocks transferred based on different protocols. The source selection algorithm based on the SDH protocol may be a G.781 source selection algorithm, and may also be other source selection algorithms based on the SDH protocol.

In the second embodiment of the present invention, the SSM corresponding to the clock is transferred in the reserved field in the head of the announce packet transferred based on the PTP, and furthermore, the SSM corresponding to the clock is transferred in a reserved field of an OAM packet transferred based on the PTP.

Figure 8:
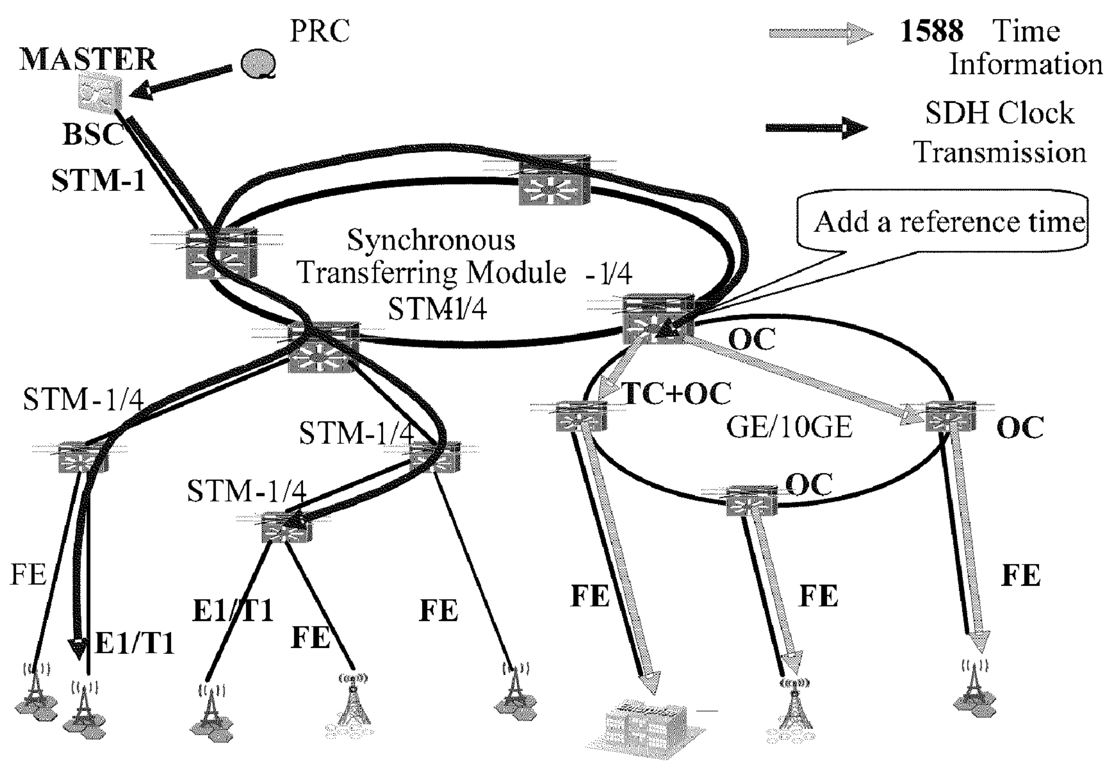
FIG. 8 is a schematic view of a situation after the SDH network and the IEEE 1588 PTP network are converged according to a third embodiment of the present invention.
Figure 9:
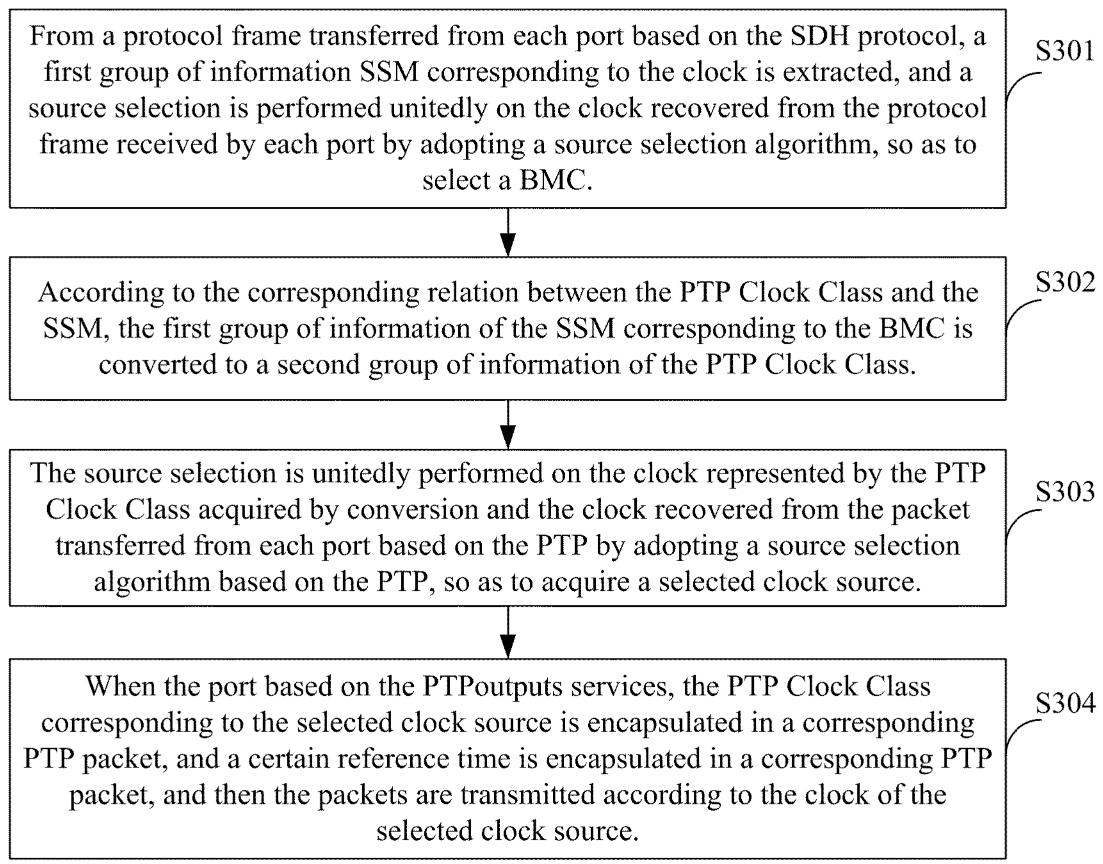
FIG. 9 is a flow chart of the third embodiment of the present invention.

In a third embodiment of the present invention, a third method of clock transmission between networks is provided. Under a situation shown in FIG. 8 that the SDH network and the IEEE 1588 PTP network are converged, the detailed implementing process that the IEEE 1588 PTP network uses the clock transferred by the SDH network is described. Here, the SDH network serves as a first network based on the SDH protocol, and the IEEE 1588 PTP network serves as a second network based on the PTP. The flow is shown in FIG. 9 and includes the following steps.

In Step S301, from a protocol frame transferred from each port based on the SDH protocol, a first group of information SSM corresponding to the clock is extracted, and a source selection is performed in a united way on the clock recovered from the protocol frame received by each port by adopting a source selection algorithm based on the SDH protocol, so as to select a BMC.

The source selection algorithm based on the SDH protocol may be a G.781 source selection algorithm, and may also be other source selection algorithms based on the SDH protocol.

In Step S302, according to the corresponding relation between the PTP Clock Class and the SSM as shown in Table 3, a first group of information SSM corresponding to the BMC is converted to a second group of information PTP Clock Class.

Through the above converting process, the second group of information PTP Clock Class corresponding to the clock source transferred by the SDH network is indirectly acquired.

In Step S303, a source selection is performed in a united way on the clock represented by the PTP Clock Class acquired by conversion and the clock recovered from the packet transferred from each port based on the PTP by adopting a source selection algorithm based on the PTP, so as to acquire a selected clock source.

The source selection algorithm based on the PTP may be a BMC algorithm, and may also be other source selection algorithms based on the PTP. The process of performing in a united way source selection by adopting the BMC algorithm is similar to relevant descriptions in the first embodiment, so it is not described in detail here.

In Step S304, when the port based on the PTP outputs services, the PTP Clock Class corresponding to the selected clock source is encapsulated in a corresponding PTP packet, for example, a Sync packet, and a certain reference time is encapsulated in a corresponding PTP packet, for example, the delay-resp packet and the delay-req packet, and then the packets are transmitted according to the clock of the selected clock source.

Accordingly, the equipment of the next level that receives the PTP Clock Class corresponding to the selected clock source performs a source selection in a united way on the clock recovered by each port according to the received PTP Clock class and the PTP Clock Class directly transferred from other ports of the equipment through a source selection algorithm based on the PTP, encapsulates the PTP Clock Class corresponding to the selected clock source in the corresponding PTP packet, for example, Sync packet, and encapsulates the adopted certain reference time to the corresponding PTP packet, for example, the delay-resp packet and the delay-req packet, and transmits the packets according to the clock of the selected clock source.

For the third embodiment, after the first group of information SSM corresponding to the clock is extracted from the protocol frame transferred from each port based on the SDH protocol, the extracted SSM corresponding to all clocks may be converted to the PTP Clock Class according to the corresponding relation between the PTP Clock Class and the SSM shown in Table 3. Then, the source selection is performed in a united way on the clock corresponding to the PTP Clock Class acquired by conversion and the clock recovered from the packets transferred from each port of the IEEE 1588 PTP by adopting the source selection algorithm based on the PTP, for example, BMC algorithm.

In the above embodiments, the SDH network and the IEEE 1588 PTP network are taken as examples for illustration, and as for the clock transmission between networks for transferring the clock related information based on different protocols, for example, the clock transmission between the SONET network and the IEEE 1588 PTP network, the method similar to the above embodiments of the present invention may be adopted.

Figure 10:
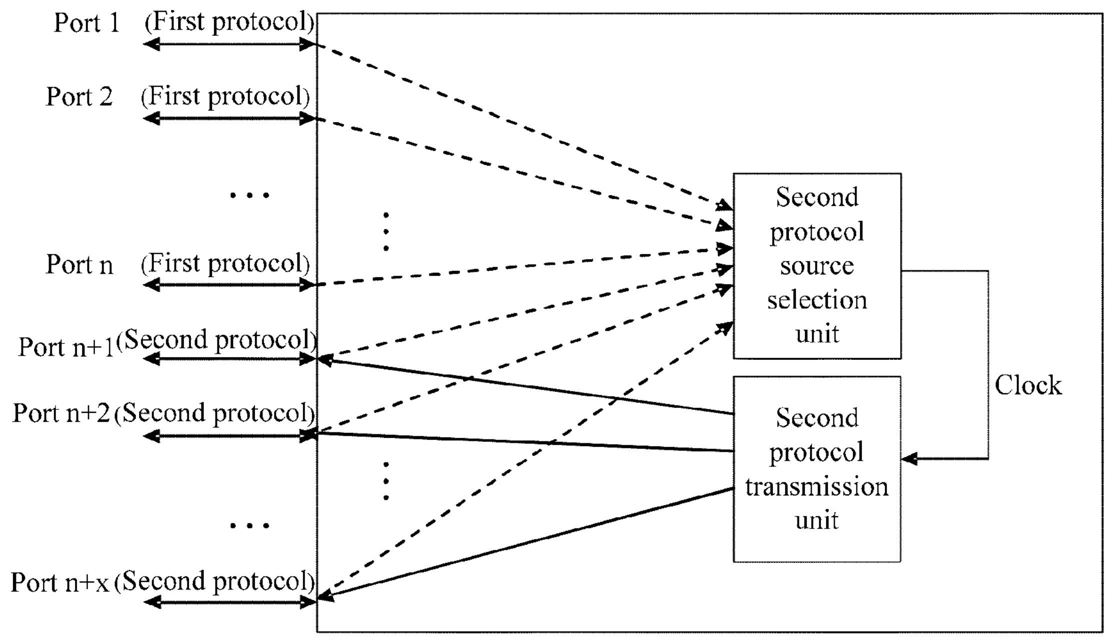
FIG. 10 is a schematic structural view of a fourth embodiment of the present invention.

In a fourth embodiment of the present invention, an apparatus of clock transmission is provided, and a structure of the apparatus is shown in FIG. 10. The apparatus includes a second protocol source selection unit and a second protocol transmission unit. The second protocol source selection unit is a source selection unit based on an SDH protocol or a source selection unit based on a SONET protocol and may further include a first acquisition subunit and a first source selection subunit.

The motions for transferring information between the units are described as follows.

The second protocol source selection unit is adapted to acquire a second group of information corresponding to a clock transferred by a first network equipment based on a first protocol, and the second group of information corresponding to a clock transferred by a second network equipment based on a second protocol, and perform a source selection in a united way on the clock transferred by the first network equipment based on the first protocol and the clock transferred by the second network equipment based on the second protocol according to the obtained second group of information by adopting a source selection manner based on the second protocol. The detailed processing situation is described as follows.

The first acquisition subunit parses information carried in a packet transferred by the first network equipment based on the first protocol, and acquires the second group of information corresponding to the clock transferred by the first network equipment based on the first protocol. For example, information carried in a received announce packet or OAM packet transferred based on a PTP is parsed, so as to acquire a second group of information SSM corresponding to the clock transferred by the first network equipment based on the PTP. Meanwhile, the first acquisition subunit further recovers the second group of information corresponding to the clock transferred by the second network equipment based on the second protocol from a protocol frame transferred by the second network equipment based on the second protocol. For example, an SSM corresponding to the clock transferred by the second network equipment based on the second protocol is acquired from an SDH protocol frame. The detailed processing situation is the same as the method in the second embodiment of the present invention, so it is not described in detail here.

The first source selection subunit performs a source selection in a united way on the clock transferred by the first network equipment based on the first protocol and the clock transferred by the second network equipment based on the second protocol according to the obtained second group of information corresponding to the clocks transferred based on different protocols by adopting a source selection manner based on the second protocol. The specific implementation is the same as the method of the second embodiment of the present invention, so it is not described in detail here.

The second protocol transmission unit transmits the second group of information corresponding to a selected clock source based on the second protocol according to the clock of the clock source selected by the second protocol source selection unit.

Figure 11:
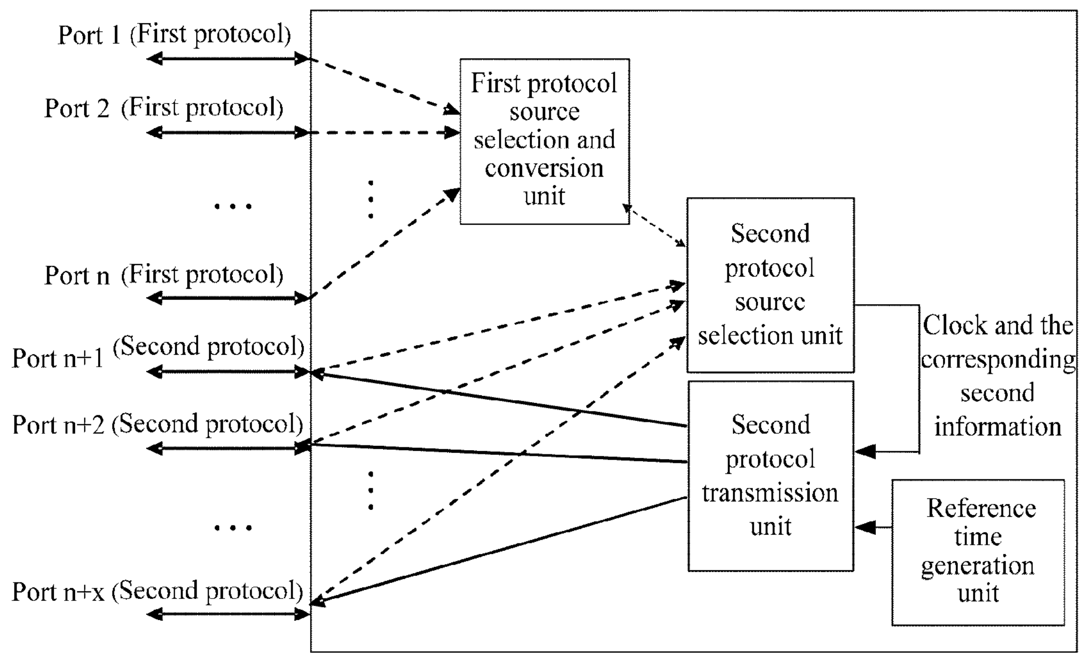
FIG. 11 is a schematic structural view of a fifth embodiment of the present invention.

In a fifth embodiment of the present invention, an apparatus of clock transmission is provided, and a structure of the apparatus is shown in FIG. 11. The apparatus includes a first protocol source selection subunit conversion unit, a second protocol source selection unit, and a second protocol transmission unit, in which the second protocol source selection unit further includes a second acquisition subunit and a second source selection subunit.

The motions of transferring information between the units are described as follows.

The first protocol source selection subunit conversion unit selects a BMC according to clocks transferred by a first network equipment based on a first protocol, acquires a first group of information corresponding to the BMC based on the first protocol, converts the first group of information corresponding to the BMC to a second group of information according to a corresponding relation between the first group of information and the second group of information.

The second protocol source selection unit acquires the second group of information acquired by converting the first group of information corresponding to the clock transferred by the first network equipment based on the first protocol, and the second group of information corresponding to a clock transferred by a second network equipment based on a second protocol, and performs a source selection in a united way on the clock transferred by the first network equipment based on the first protocol and the clock transferred by the second network equipment based on the second protocol according to the obtained second group of information by adopting a source selection manner based on the second protocol. The detailed processing situation is described as follows.

The second acquisition subunit is adapted to acquire the second group of information acquired by conversion and corresponding to the BMC from the first protocol source selection subunit conversion unit, and acquire the second group of information corresponding to the clock transferred by the second network equipment based on the second protocol.

The second source selection subunit is adapted to perform a source selection in a united way on the clock of the BMC and the clock transferred by the second network equipment based on the second protocol by adopting a source selection manner based on the second protocol according to the second group of information acquired by conversion and corresponding to the BMC and the second group of information corresponding to the clock transferred by the second network equipment based on the second protocol.

The second protocol transmission unit is adapted to transmit the second group of information corresponding to a selected clock source based on the second protocol according to the clock of the clock source selected by the second protocol source selection unit.

The first protocol source selection subunit conversion unit may be a source selection subunit conversion unit based on the SDH protocol, a source selection subunit conversion unit based on the SONET protocol, or a source selection subunit conversion unit based on the PTP. If the first protocol source selection subunit conversion unit is the source selection subunit conversion unit based on the SDH protocol or the source selection subunit conversion unit based on the SONET protocol, the second protocol source selection unit is a source selection unit based on the PTP, the second protocol transmission unit is a transmission unit based on the PTP, and in this case, the apparatus further includes a reference time generation unit. If the first protocol source selection subunit conversion unit is the source selection subunit conversion unit based on the PTP, the second protocol source selection unit is a source selection unit based on the SDH protocol or a source selection unit based on the SONET protocol. Correspondingly, when the second protocol source selection unit is the source selection unit based on the SDH protocol, the second protocol transmission unit is a transmission unit based on the SDH protocol. When the second protocol source selection unit is the source selection unit based on the SONET protocol, the second protocol transmission unit is a transmission unit based on the SONET protocol.

The fifth embodiment of the present invention is described below in detail, in which, for example, the first protocol source selection subunit conversion unit in the apparatus of clock transmission is the source selection subunit conversion unit based on the SDH protocol, the second protocol source selection unit is the source selection unit based on the PTP, the second protocol transmission unit is the transmission unit based on the PTP, and the apparatus of clock transmission further includes a reference time generation unit.

The first protocol source selection subunit conversion unit recovers a clock according to an SDH protocol frame transferred by the first network equipment, calculates a BMC through a source selection manner based on the SDH protocol, for example, G.781 source selection algorithm, acquires a first group of information SSM corresponding to the BMC from a protocol frame relevant to the BMC, and then converts the first group of information SSM to a second group of information PTP Clock Class according to the corresponding relation between the PTP Clock Class and the SSM as shown in Table 3.

The second protocol source selection unit performs a source selection in a united way on the clock represented by the second group of information PTP Clock Class acquired by conversion and the clock recovered from the packets transferred from each port based on the PTP by adopting a source selection algorithm based on the PTP, for example, BMC algorithm, so as to acquire a selected clock source.

When each port based on the PTP outputs services, the second protocol transmission unit encapsulates the PTP Clock Class corresponding to the selected clock source in a corresponding PTP packet, encapsulates a certain reference time generated by the reference time generation unit in a corresponding PTP packet, and transmits the packets according to the clock of the selected clock source. Here, under the situation that the IEEE 1588 PTP network only needs to transfer the progressive clock and does not need to transfer the precise time, it does not have special requirements on the reference time generated by the reference time generation unit.

The fifth embodiment of the present invention is described below in detail, in which, for example, the first protocol source selection subunit conversion unit in the apparatus of clock transmission is the source selection subunit conversion unit based on the PTP, the second protocol source selection unit is the source selection unit based on the SDH protocol, and the second protocol transmission unit is the transmission unit based on the SDH protocol.

The first protocol source selection subunit conversion unit recovers a clock from a PTP packet transferred by a first network equipment, calculates a BMC through a source selection manner based on the PTP, for example, BMC source selection algorithm, acquires a first group of information PTP Clock Class corresponding to the BMC from the PTP packet relevant to the BMC, and then converts the first group of information PTP Clock Class to a second group of information SSM according to the corresponding relation between the PTP Clock Class and the SSM as shown in Table 3.

The second protocol source selection unit performs a source selection in a united way on the clock corresponding to the BMC and the clock transferred from the SDH port according to the SSM acquired by conversion and the SSM transferred from the SDH port by adopting a source selection algorithm, for example, G.781 source selection algorithm, so as to acquire a selected clock source.

The second protocol transmission unit transmits a second group of information SSM corresponding to the selected clock source based on the SDH protocol according to the clock of the selected clock source.

Figure 12:
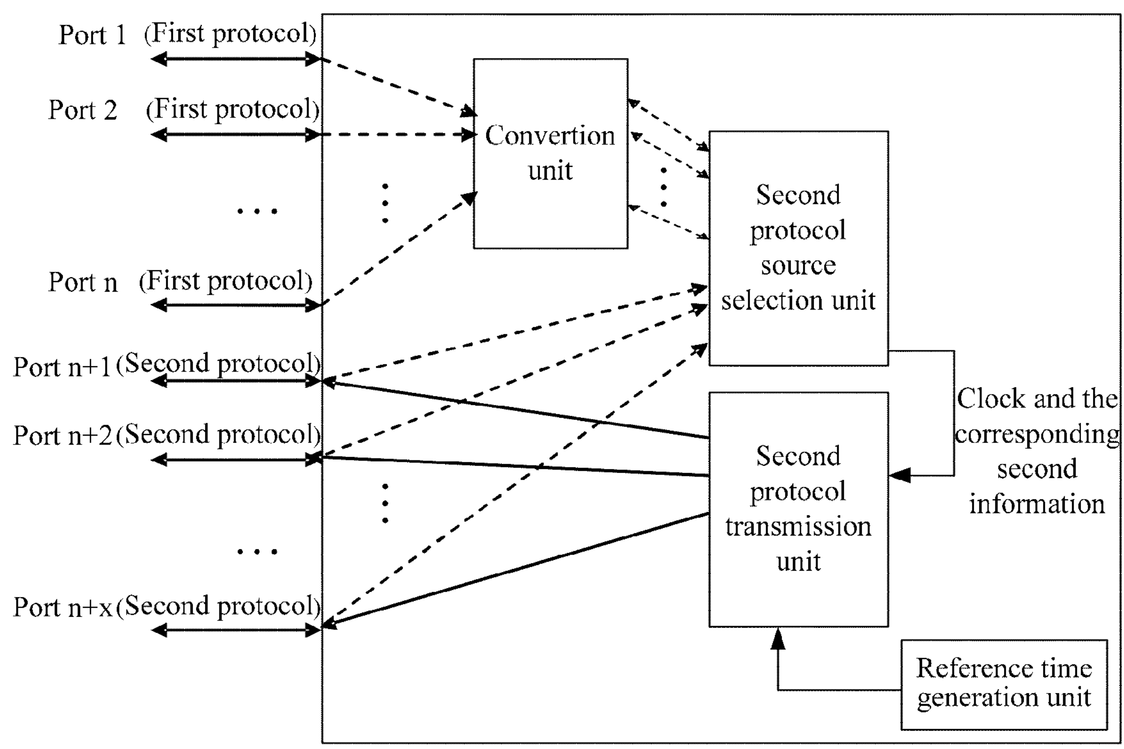
FIG. 12 is a schematic structural view of a sixth embodiment of the present invention.

In a sixth embodiment of the present invention, an apparatus of clock transmission is provided, and a structure of the apparatus is shown in FIG. 12. The apparatus includes a conversion unit, a second protocol source selection unit, and a second protocol transmission unit, in which the second protocol source selection unit further includes a third acquisition subunit and a third source selection subunit. In the apparatus of clock transmission of this embodiment, the conversion unit may be a conversion unit based on an SDH protocol or a conversion unit based on a SONET protocol, the second protocol source selection unit may be a source selection unit based on a PTP, and correspondingly, the second protocol transmission unit may be a transmission unit based on the PTP. The apparatus of clock transmission further includes a reference time generation unit.

The motions for transferring information between units are described as follows. The conversion unit is adapted to acquire a first group of information corresponding to a clock transferred by a first network equipment based on a first protocol from a protocol frame transferred by the first network equipment based on the first protocol, and convert the first group of information corresponding to all the clocks transferred by the first network equipment based on the first protocol to the second group of information according to a corresponding relation between the first group of information and the second group of information.

The second protocol source selection unit is adapted to acquire the second group of information acquired by converting the first group of information corresponding to the clock transferred by the first network equipment based on the first protocol, and the second group of information corresponding to a clock transferred by a second network equipment based on a second protocol, and perform a source selection in a united way on the clock transferred by the first network equipment based on the first protocol and the clock transferred by the second network equipment based on the second protocol according to the obtained second group of information by adopting a source selection manner based on the second protocol. The detailed processing situation is described as follows.

The third acquisition subunit is adapted to acquire from the conversion unit the second group of information acquired by converting the first group of information corresponding to all the clocks, and acquire the second group of information corresponding to the clock transferred by the second network equipment from the packet transferred by the second network equipment based on the second protocol.

The third source selection subunit is adapted to perform in a united way a source selection on all the clocks transferred by the first network equipment based on the first protocol and the clock transferred by the second network equipment based on the second protocol according to all the second group of information acquired by conversion from the third acquisition subunit and the second group of information corresponding to the clock transferred by the second network equipment based on the second protocol from the third acquisition subunit through a source selection manner based on the second protocol.

The second protocol transmission unit transmits a second group of information corresponding to the selected clock source and a certain reference time generated by the reference time generation unit based on the second protocol according to the clock of the clock source selected by the second protocol source selection unit.

The detailed implementation of the sixth embodiment of the present invention is the same as the descriptions of the method of the third embodiment, so it is not described in detailed here.

In the seventh embodiment of the present invention, an apparatus for transmitting clock quality class information is provided, which includes a construction unit and a transmission unit, in which the construction unit further includes a first construction subunit or a second construction subunit.

The motions for transferring information between units are described as follows.

The construction unit carries an SSM packet for representing the clock quality class in a PTP packet. The detailed processing situation is described as follows.

The first construction subunit carries the SSM representing the clock quality class in a reserved field of a head of an announce packet based on the PTP, or the second construction subunit carries the SSM representing the clock quality class in a reserved field of a head of an Operation, Administration, and Maintenance (OAM) packet based on the PTP.

The transmission unit transmits the PTP packet acquired by the construction unit.

As seen from the detailed implementation solution of the present invention, the second group of information corresponding to the clock transferred by the first network equipment based on the first protocol, and the second group of information corresponding to the clock source transferred by the second network equipment based on the second protocol are acquired, and then the source selection is performed in a united way by adopting the source selection manner based on the second protocol according to the obtained second group of information. Therefore, the equipment in different types of networks can conveniently select a clock with a higher class from clocks transferred based on different protocols, so as to realize a normalization management on the clocks transferred based on different protocols.

It will be apparent to those skilled in the art that various modifications and variations can be made to the structure of the present invention without departing from the scope or spirit of the invention. In view of the foregoing, it is intended that the present invention cover modifications and variations of this invention provided that they fall within the scope of the following claims and their equivalents.

What is claimed is:

1. A method of clock transmission between networks, comprising:

acquiring a second information corresponding to a clock transferred by a first network equipment based on a first protocol, and the second information corresponding to a clock transferred by a second network equipment based on a second protocol;

performing a source selection in a united way on the clock transferred by the first network equipment based on the first protocol and the clock transferred by the second network equipment based on the second protocol according to the obtained second information; and transmitting the second information corresponding to a selected clock source based on the second protocol according to the clock of the selected clock source;

wherein the acquiring the second information corresponding to the clock transferred by the first network equipment based on the first protocol comprises:

parsing a protocol frame transferred by the first network equipment based on the first protocol to acquire a first information corresponding to the clock transferred by the first network equipment; and converting the first information corresponding to all clocks transferred by the first network equipment to the second information according to a corresponding relation between the first information and the second information;

wherein the first protocol comprises an SDH protocol or a SONET protocol, the second protocol comprises a PTP, the first information is a synchronous status message (SSM), and the second information is PTP clock class information.

2. A method of clock transmission between networks, comprising:

acquiring a second information corresponding to a clock transferred by a first network equipment based on a first protocol, and the second information corresponding to a clock transferred by a second network equipment based on a second protocol;

performing a source selection in a united way on the clock transferred by the first network equipment based on the first protocol and the clock transferred by the second network equipment based on the second protocol according to the obtained second information; and transmitting the second information corresponding to a selected clock source based on the second protocol according to the clock of the selected clock source;

wherein the acquiring the second information corresponding to the clock transferred by the first network equipment based on the first protocol comprises:

selecting a best master clock (BMC) according to clock sources transferred by the first network equipment based on the first protocol; acquiring a first information corresponding to the BMC from a packet or a protocol frame transferred by the first network equipment based on the first protocol; and converting the first information corresponding to the BMC to the second information according to a corresponding relation between the first information and the second information;

wherein the first protocol comprises a PTP, the second protocol comprises an SDH protocol or a SONET protocol, the first information is a PTP clock class information, and the second information is an SSM; or the first protocol comprises an SDH protocol or a SONET protocol, the second protocol comprises a PTP, the first information is an SSM, and the second information is a PTP clock class information.

3. An apparatus of clock transmission, comprising:

a second protocol source selection unit, configured to acquire a second information corresponding to a clock transferred by a first network equipment based on a first protocol, and the second information corresponding to a clock transferred by a second network equipment based on a second protocol; and perform a source selection in a united way on the clock transferred by the first network equipment based on the first protocol and the clock transferred by the second network equipment based on the second protocol by adopting a source selection manner based on the second protocol according to the obtained second information; and a second protocol transmission unit, configured to transmit the second information corresponding to a selected clock source based on the second protocol according to the clock of the selected clock source.

4. The apparatus according to claim 3, further comprising:

a first protocol source selection and conversion unit, configured to select a best master clock (BMC) according to the clock transferred by the first network equipment based on the first protocol, acquire a first information corresponding to the BMC, convert the first information corresponding to the BMC to the second information according to a corresponding relation between the first information and the second information, and provide the second information acquired by conversion to the second protocol source selection unit; or a conversion unit, configured to acquire a first information corresponding to the clock transferred by the first network equipment based on the first protocol, convert the first information corresponding to all clocks transferred by the first network equipment based on the first protocol to the second information according to a corresponding relation between the first information and the second information, and provide the second information acquired by conversion to the second protocol source selection unit.

5. The apparatus according to claim 3, wherein the second protocol source selection unit comprises:

a first acquisition subunit, configured to parse information carried by a packet transferred based on the first protocol, acquire the second information corresponding to the clock transferred by the first network equipment based on the first protocol, and acquire the second information corresponding to the clock transferred by the second network equipment based on the second protocol from a protocol frame transferred by the second network equipment based on the second protocol; and a first source selection subunit, configured to perform a source selection in united way on the clock transferred by the first network equipment based on the first protocol and the clock transferred by the second network equipment based on the second protocol by adopting a source selection manner based on the second protocol according to the second information acquired by the first acquisition subunit.

6. The apparatus according to claim 3, wherein the second protocol source selection unit comprises:

a second acquisition subunit, configured to acquire the second information obtained by converting the first information of the BMC based on the first protocol from the first protocol source selection and conversion unit, and acquire the second information corresponding to the clock transferred by the second network equipment based on the second protocol; and a second source selection subunit, configured to perform a source selection in a united way on the clock corresponding to the BMC and the clock transferred by the second network equipment based on the second protocol by adopting a source selection manner based on the second protocol according to the second information acquired by the second acquisition subunit.

7. The apparatus according to claim 3, wherein the second protocol source selection unit comprises:

a third acquisition subunit, configured to acquire the second information acquired by converting the first information of all the clocks based on the first protocol from the conversion unit; and acquire the second information corresponding to the clock transferred by the second network equipment based on the second protocol; and a third source selection subunit, configured to perform a source selection in a united way on all the clocks transferred by the first network equipment based on the first protocol and the clock transferred by the second network equipment based on the second protocol by adopting the source selection manner based on the second protocol according to the second information acquired by the third acquisition subunit.

* * * * *